(12) United States Patent
Itoh et al.

(10) Patent No.: US 12,240,442 B2
(45) Date of Patent: Mar. 4, 2025

(54) VEHICLE INFORMATION DELIVERY DEVICE, VEHICLE INFORMATION DELIVERY METHOD, AND STORAGE MEDIUM

(71) Applicant: TOYOTA JIDOSHA KABUSHIKI KAISHA, Aichi-ken (JP)

(72) Inventors: Masayuki Itoh, Nagoya (JP); Iwao Maeda, Nagoya (JP); Tatsuya Sugano, Susono (JP); Norinao Watanabe, Susono (JP); Yutaka Nakamura, Susono (JP); Yoshikazu Jikuhara, Susono (JP); Yuki Nishikawa, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 249 days.

(21) Appl. No.: 18/061,478

(22) Filed: Dec. 5, 2022

(65) Prior Publication Data

US 2023/0219563 A1 Jul. 13, 2023

(30) Foreign Application Priority Data

Jan. 12, 2022 (JP) ................................. 2022-003227

(51) Int. Cl.
*B60W 30/06* (2006.01)
*G06V 20/56* (2022.01)
(52) U.S. Cl.
CPC ............. *B60W 30/06* (2013.01); *G06V 20/56* (2022.01); *B60W 2420/403* (2013.01); *B60W 2556/45* (2020.02)

(58) Field of Classification Search
None
See application file for complete search history.

(56) References Cited

U.S. PATENT DOCUMENTS

| 10,590,669 | B2 | 3/2020 | Boussard et al. |
| 2011/0082588 | A1* | 4/2011 | McDowell, Jr. ........ E04H 6/225 414/256 |
| 2017/0078767 | A1* | 3/2017 | Borel .................... G11B 27/031 |
| 2017/0278394 | A1* | 9/2017 | Fuehrer ................. B60W 50/04 |
| 2020/0062243 | A1* | 2/2020 | Perez Barrera .... B62D 15/0285 |
| 2020/0070890 | A1* | 3/2020 | Hattori ..................... H04W 4/38 |
| 2020/0180572 | A1* | 6/2020 | Tzivanopoulos ....... E04H 6/305 |
| 2020/0269425 | A1 | 8/2020 | Shikano et al. |
| 2020/0285245 | A1* | 9/2020 | Noguchi ................ G08G 1/149 |

(Continued)

FOREIGN PATENT DOCUMENTS

| JP | 2017-535991 A | 11/2017 |
| JP | 2018-203468 A | 12/2018 |

(Continued)

*Primary Examiner* — Jonathan L Sample
*Assistant Examiner* — Alan Lindsay Ostrow
(74) *Attorney, Agent, or Firm* — HAUPTMAN HAM, LLP

(57) ABSTRACT

A vehicle information delivery device includes an image processing unit configured to generate vehicle related images indicating the status of a vehicle moving unmanned in a predetermined target area based on camera images taken in the target area where unattended parking is performed, and an information sending unit configured to send delivery information including the vehicle related images to a display terminal visually recognized by a user of the vehicle.

17 Claims, 15 Drawing Sheets

(56) References Cited

U.S. PATENT DOCUMENTS

| | | |
|---|---|---|
| 2021/0158632 A1 | 5/2021 | Nishiyama et al. |
| 2022/0073059 A1* | 3/2022 | Yamaura ............... G08G 1/0129 |
| 2023/0084083 A1* | 3/2023 | Chow .................... G06V 20/56 |
| | | 382/103 |
| 2023/0388442 A1* | 11/2023 | Carolus ................ H04N 5/2625 |

FOREIGN PATENT DOCUMENTS

| | | |
|---|---|---|
| JP | 2018204373 A | 12/2018 |
| JP | 2020-138617 A | 9/2020 |
| JP | 2020-144698 A | 9/2020 |
| JP | 2021-083034 A | 5/2021 |

\* cited by examiner

VEHICLE INFORMATION DELIVERY DEVICE, VEHICLE INFORMATION DELIVERY METHOD, AND STORAGE MEDIUM

CROSS-REFERENCE TO RELATED APPLICATION

This application claims priority to Japanese Patent Application No. 2022-003227 filed on Jan. 12, 2022, incorporated herein by reference in its entirety.

BACKGROUND

1. Technical Field

The present disclosure relates to a vehicle information delivery device, a vehicle information delivery method, and a storage medium.

2. Description of Related Art

Japanese Unexamined Patent Application Publication No. 2018-204373 (JP 2018-204373 A) describes a parking facility for unattended parking of autonomous vehicles and non-autonomous vehicles. In this parking facility, an autonomous vehicle moves autonomously to a parking space while a non-autonomous vehicle is conveyed to a parking space by an autonomous conveyor.

SUMMARY

When such unattended parking is performed, a vehicle is handed over in a predetermined entry/exit area with no need for the user of the vehicle to enter the parking area. Therefore, while this frees the user of the vehicle from the complicated work involved in parking, there is a risk that the user of the vehicle may feel uneasy about the status of the vehicle moving unmanned.

In view of the foregoing, it is an object of the present disclosure to provide information on a vehicle to the user of the vehicle that is moving unmanned when unattended parking is performed.

The summary of the present disclosure is as follows.

(1) A first aspect of the present disclosure relates to a vehicle information delivery device including an image processing unit and an information sending unit. The image processing unit is configured to generate vehicle related images based on camera images taken in a predetermined target area where unattended parking is performed. The vehicle related images indicate the status of a vehicle moving unmanned in the target area. The information sending unit is configured to send delivery information including the vehicle related images to a display terminal visually recognized by the user of the vehicle.

(2) In the vehicle information delivery device according to (1) described above, the display terminal may be the mobile terminal of the user.

(3) In the vehicle information delivery device according to (1) or (2) described above, the vehicle related images may be moving images indicating the status of the vehicle and having a playback speed that has been changed.

(4) In the vehicle information delivery device according to any one of (1) to (3) described above, the information sending unit may be configured to send the delivery information to the display terminal when the movement of the vehicle is completed.

(5) In the vehicle information delivery device according to any one of (1) to (4) described above, the camera images may include the appearance images of the vehicle.

(6) In the vehicle information delivery device according to any one of (1) to (5) described above, the vehicle may be conveyed in the target area by a vehicle conveyor and the camera images may be images taken by a camera mounted on the vehicle conveyor.

(7) The vehicle information delivery device according to any one of (1) to (6) described above may further include an abnormality diagnosis unit configured to perform the abnormality diagnosis of the vehicle. In the vehicle information delivery device, the vehicle may be conveyed in the target area by a vehicle conveyor, and the abnormality diagnosis unit may be configured to perform the abnormality diagnosis of the vehicle based on the image of the bottom of the vehicle taken by a camera provided on the vehicle conveyor.

(8) In the vehicle information delivery device according to (7) described above, the abnormality diagnosis unit may be configured to send the result of the abnormality diagnosis to the mobile terminal of the user of the vehicle when an abnormality is detected in the vehicle.

(9) The vehicle information delivery device according to any one of (1) to (8) described above may further include a position information acquisition unit configured to acquire position information on the vehicle. In the vehicle information delivery device, the delivery information may include the position information on the vehicle.

(10) The vehicle information delivery device according to any one of (1) to (9) described above may further include a position information acquisition unit configured to acquire the position information on the vehicle. In the vehicle information delivery device, the position information acquisition unit may be configured to calculate an estimated required time to complete the movement of the vehicle based on the position information, and the delivery information may include the estimated required time.

(11) In the vehicle information delivery device according to (10) described above, the position information acquisition unit may be configured to determine, based on the estimated required time, whether the movement of the vehicle for exiting from the parking lot will be completed by the scheduled time, and the information sending unit may be configured to send the delivery information to the display terminal when it is determined that the movement of the vehicle for exiting from the parking lot will not be completed by the scheduled time.

(12) The vehicle information delivery device according to any one of (1) to (11) described above may further include an abnormality detection unit configured to detect an abnormality related to the movement of the vehicle. In the vehicle information delivery device, the information sending unit may be configured to send the delivery information to the display terminal when an abnormality related to the movement of the vehicle is detected.

(13) In the vehicle information delivery device according to (12) described above, the vehicle may be conveyed in the target area by the vehicle conveyor, and the abnormality detection unit may be configured to detect an abnormality in the vehicle conveyor as the abnormality related to the movement of the vehicle.

(14) A second aspect of the present disclosure relates to a vehicle information delivery method performed by a computer and including generating and sending. The generating generates vehicle related images based on camera images taken in a predetermined target area where unattended parking is performed. The vehicle related images indicate the status of a vehicle moving unmanned in the target area. The sending sends delivery information including the vehicle related images to a display terminal visually recognized by the user of the vehicle.

(15) A third aspect of the present disclosure relates to a storage medium storing a computer program for delivering vehicle information. The computer program causes a computer to perform processing to generate and to send. The processing to generate generates vehicle related images based on camera images taken in the target area where unattended parking is performed. The vehicle related images indicate the status of a vehicle moving unmanned in a predetermined target area. The processing to send sends delivery information including the vehicle related images to a display terminal visually recognized by a user of the vehicle.

According to the present disclosure, when unattended parking of a vehicle is performed, information on a vehicle moving unmanned can be provided to the user of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described in detail below with reference to the drawings. In the description below, similar components are given the same reference numbers.

First Embodiment

Figure 1:
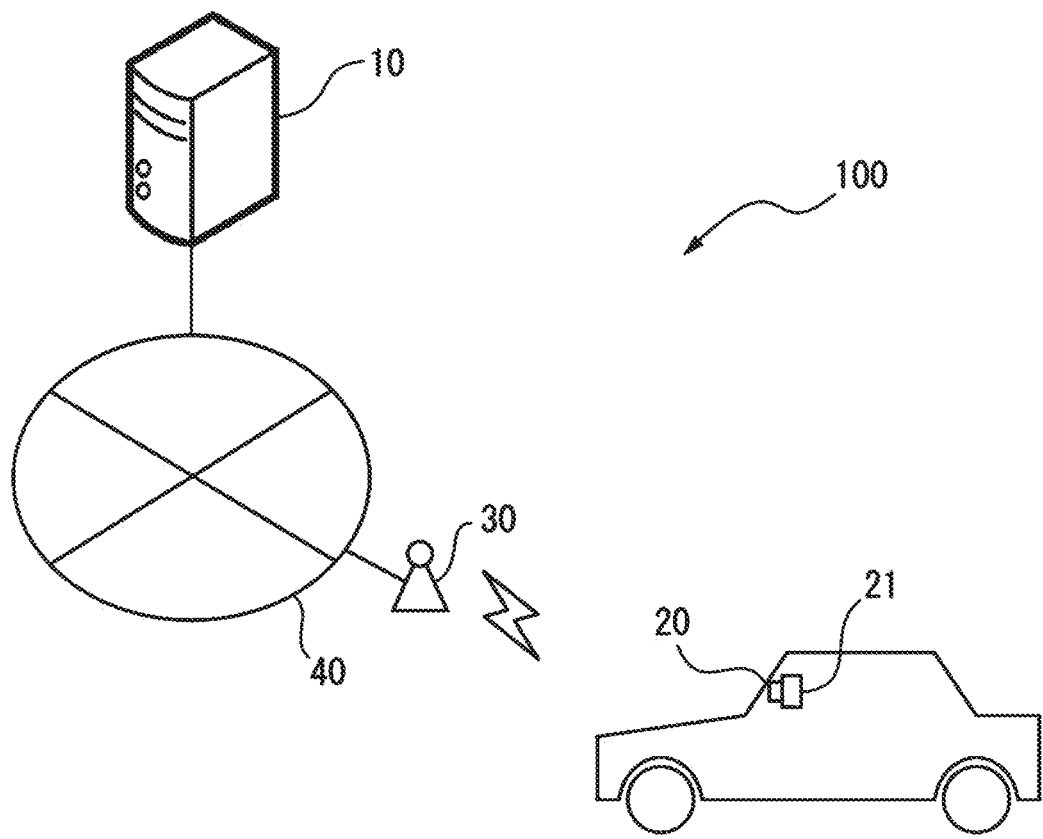
FIG. 1 is a schematic configuration diagram of an automated parking system according to a first embodiment of the present disclosure.

First, a first embodiment of the present disclosure will be described with reference to FIG. 1 to FIG. 7. FIG. 1 is a schematic configuration diagram of an automated parking system 100 according to the first embodiment of the present disclosure. As shown in FIG. 1, the automated parking system 100 includes a parking control server 10 and at least one vehicle 20 to implement unattended parking. The parking control server 10 can communicate with the vehicle 20 via a wireless base station 30, such as a macro cell or a small cell, and a communication network 40 such as the Internet network or a carrier network.

The vehicle 20, an autonomous vehicle in which acceleration, steering, and deceleration (braking) of the vehicle 20 are all performed automatically, has a known configuration (in-vehicle camera 21, GNSS receiver, drive motor, brake actuator, steering motor, etc.) for implementing autonomous driving. The vehicle 20 is capable of unmanned driving and performs unattended parking in a predetermined target area according to an instruction from the parking control server 10.

Figure 2:
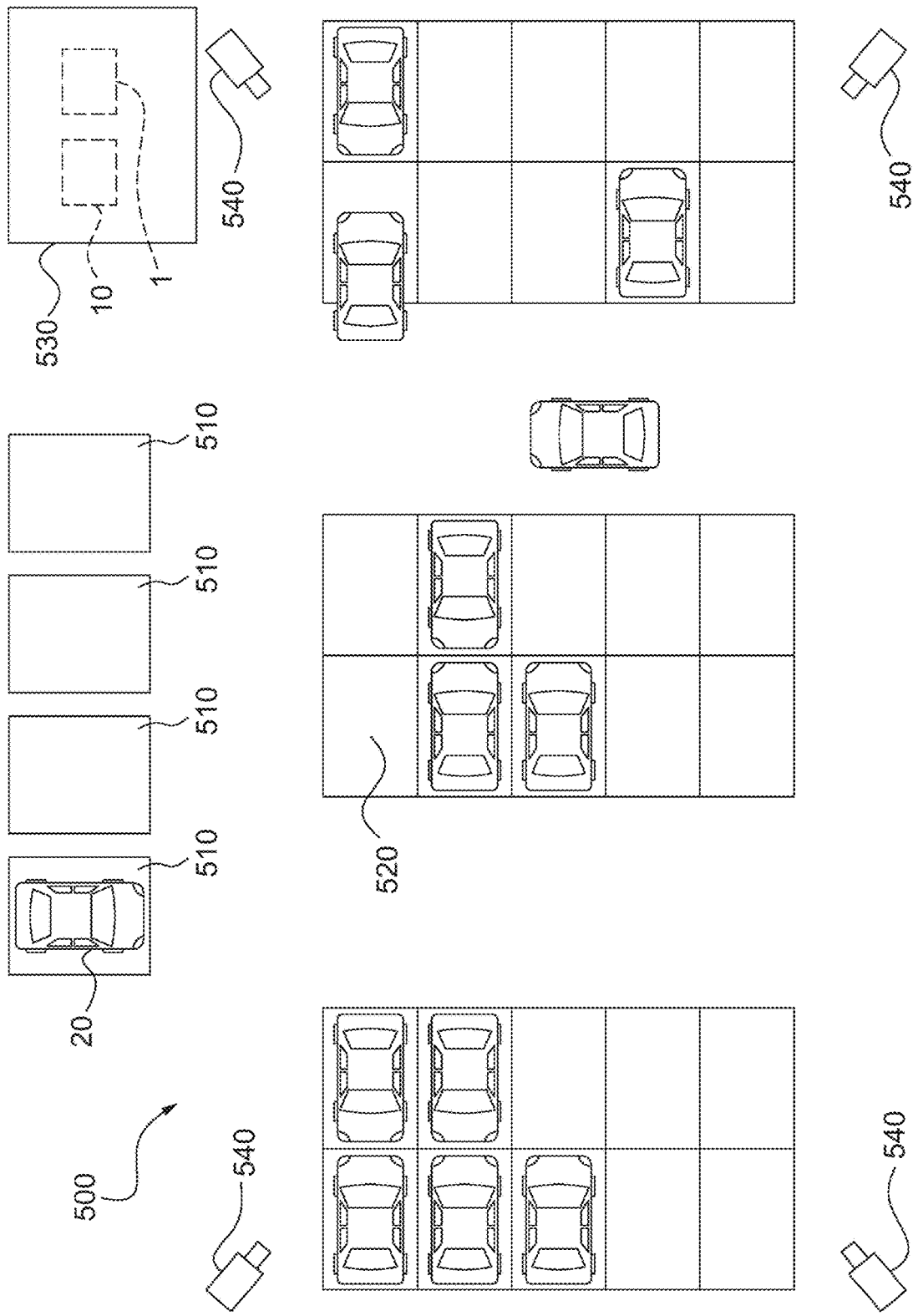
FIG. 2 is a diagram showing an example of a status in which unattended parking is performed in a predetermined target area.

FIG. 2 is a diagram showing an example of a status in which unattended parking is performed in a predetermined target area 500. The target area 500 is the parking lot of a facility such as an airport, a station, an amusement park, a hospital, a stadium, or a shopping center. The target area 500 has a plurality of boarding and alighting spaces 510 where the users (occupants) of the vehicles 20 get in or out of the vehicles and a plurality of parking spaces 520 where the vehicles 20 are parked. In the target area 500, the vehicle 20 moves unmanned for parking in, or exiting from, the parking lot.

In this embodiment, four boarding and alighting spaces 510 are provided near the entrance of the target area. In each of the boarding and alighting spaces 510, one vehicle 20 is stopped. When the vehicle 20 is to park in the parking lot, the user of the vehicle 20 gets out of the vehicle 20 in one of the boarding and alighting spaces 510. On the other hand, when the vehicle 20 is to exit from the parking lot, the user of the vehicle 20 gets in the vehicle 20 in one of the boarding and alighting spaces 510. The boarding and alighting spaces 510 may be provided in an open space or in a garage-like space that can be opened and closed. Note that, in the target area 500, the space where the user of the vehicle 20 gets out of the vehicle 20 for parking in the parking lot and the space where the user of the vehicle 20 gets in the vehicle 20 for exiting from the parking lot may be provided separately.

In this embodiment, thirty parking spaces 520 are provided in the area in front of the boarding and alighting spaces 510. In one parking space 520, one vehicle 20 is parked. When the vehicle 20 is to park in the parking lot, the vehicle 20 moves unmanned from the boarding and alighting space 510 to the parking space 520 autonomously. On the other hand, when the vehicle 20 is to exit from the parking lot, the vehicle 20 moves unmanned from parking space 520 to the boarding and alighting space 510 autonomously.

The parking control server 10 is arranged, for example, in a parking management center 530 provided near the boarding and alighting space 510. The parking control server 10, which includes a communication interface, a storage device, a memory, a processor, etc., manages unattended parking in the target area 500. For example, when the vehicle 20 is to park in the parking lot, the parking control server 10 sends an instruction to the vehicle 20 to indicate the parking space 520 where the vehicle 20 is to park and, when the vehicle 20 is to exit from the parking lot, sends an instruction to the vehicle 20 to indicate the boarding and alighting space 510 where the vehicle 20 is to stop.

When unattended parking as described above is performed, the vehicle 20 is handed over in the boarding and alighting space 510, with no need for the user of the vehicle 20 to enter the parking area where the vehicle 20 moves unmanned. This eliminates the need to secure a space in the parking area where the user of the vehicle 20 gets in and out of the vehicle, providing more parking spaces 520 in the predetermined range. This also frees the user of the vehicle 20 from a bothersome task of parking, such as searching for the parking space 520 and manipulating the vehicle for parking.

On the other hand, the user of the vehicle 20 who got out of the vehicle 20 may feel uneasy about the status of the vehicle 20 in the target area 500. To address this problem, this embodiment monitors the status of the vehicle 20 moving unmanned in the target area 500 and, when necessary, delivers the information indicating the status of the vehicle 20 to the user of the vehicle 20, as will be described in detail below.

Figure 3:
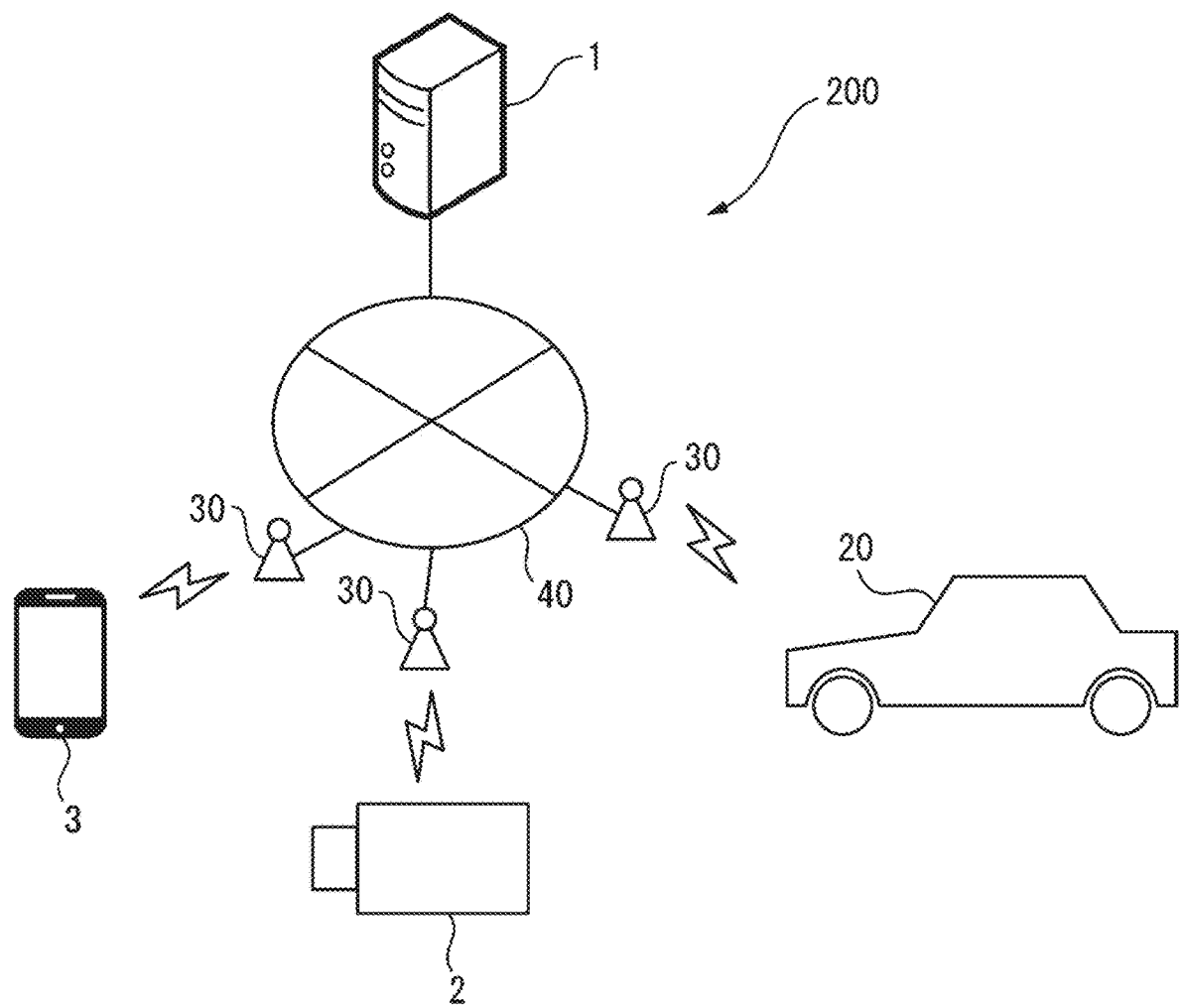
FIG. 3 is a schematic configuration diagram of a vehicle information delivery system according to the first embodiment of the present disclosure.

FIG. 3 is a schematic configuration diagram of a vehicle information delivery system 200 according to the first embodiment of the present disclosure. The vehicle information delivery system 200 includes an information delivery server 1 and at least one camera 2. The information distribution server 1 can communicate with the camera 2 and the vehicle 20 via the wireless base station 30, such as a macro cell or a small cell, and the communication network 40 such as the Internet network or a carrier network.

The camera 2 takes the picture of the target area 500 to generate an image of the target area 500. For example, the camera 2 is a fixed camera arranged in the target area 500. In the example shown in FIG. 2, a plurality of (four) fixed cameras 540, arranged at the four corners of the target area 500, collaborate to take the picture of the entire target area 500. The number and position of the fixed cameras 540 are set so that there are no blind spots in the target area 500. The fixed cameras are also called infrastructure cameras.

The information delivery server 1 uses the camera 2 to deliver the information on the vehicle 20 in the target area 500 to the user of the vehicle 20. The information delivery server 1 is an example of a vehicle information delivery device. As shown in FIG. 2, the information delivery server 1 is arranged, for example, in the parking management center 530. The information delivery server 1 and the parking control server 10 may be the same server.

Figure 4:
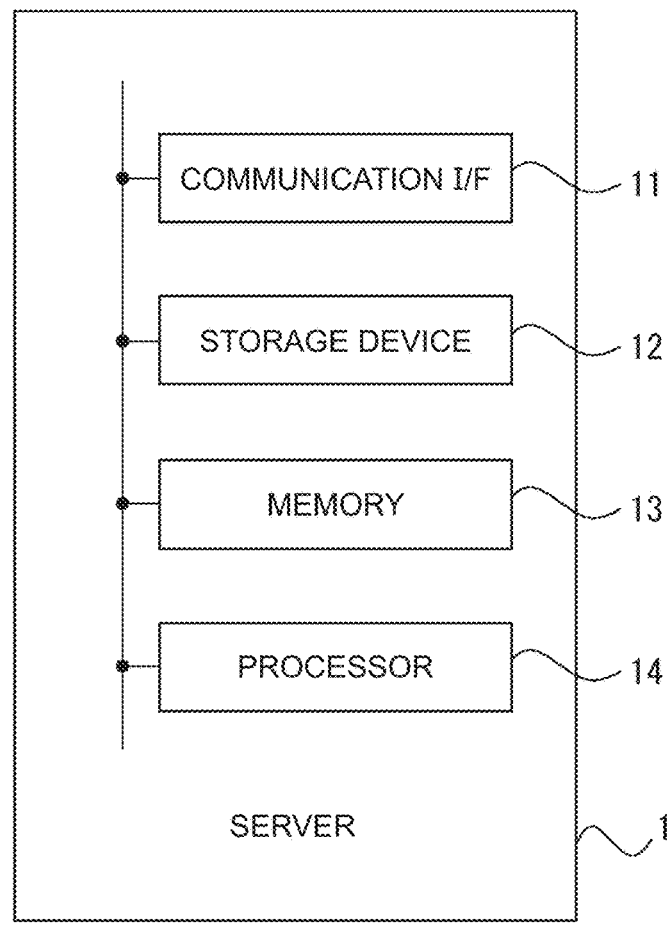
FIG. 4 is a diagram schematically showing the configuration of an information delivery server.

FIG. 4 is a diagram schematically showing the configuration of the information delivery server 1. The information delivery server 1 includes a communication interface 11, a storage device 12, a memory 13, and a processor 14. The communication interface 11, the storage device 12, and the memory 13 are connected to the processor 14 via a signal line. The information delivery server 1 may further include an input device, such as a keyboard and a mouse, and an output device such as a display. The information delivery server 1 may be configured by a plurality of computers.

The communication interface 11 has an interface circuit for connecting the information delivery server 1 to the communication network 40. The information delivery server 1 communicates with the camera 2 and the vehicle 20 via the communication network 40. The communication interface 11 is an example of the communication unit of the information delivery server 1.

The storage device 12 includes, for example, a hard disk drive (HDD), a solid state drive (SDD), or an optical recording medium and an access device thereof. The storage device 12, which stores various types of data, stores computer programs such as those used by the processor 14 to perform various types of processing. The storage device 12 is an example of the storage unit of the information delivery server 1.

The memory 13 includes a non-volatile semiconductor memory (for example, RAM). The memory 13 temporarily stores various types of data such as data that is used when the processor 14 performs various types of processing. The memory 13 is another example of the storage unit of the information delivery server 1.

The processor 14 includes one or more CPUs and their peripheral circuits to perform various types of processing. The processor 14 may further include other arithmetic circuits such as a logical operation unit, a numerical operation unit, or a graphic processing unit.

Figure 5:
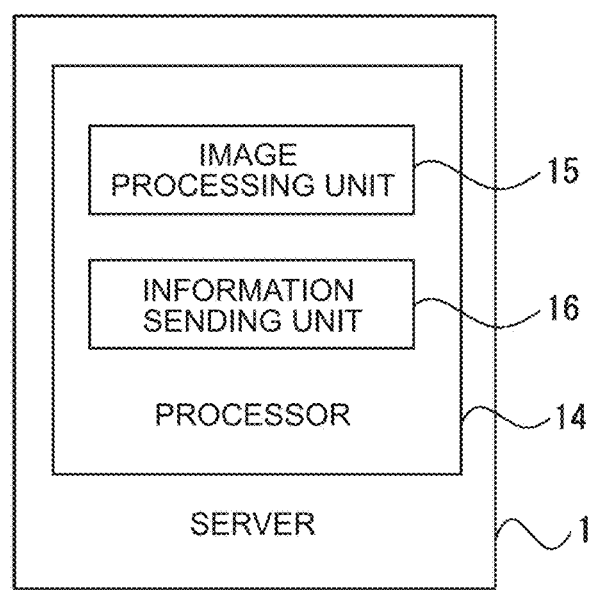
FIG. 5 is a functional block diagram of a processor of the information delivery server in the first embodiment.

FIG. 5 is a functional block diagram of the processor 14 of the information delivery server 1 in the first embodiment. In this embodiment, the processor 14 includes an image processing unit 15 and an information sending unit 16. The image processing unit 15 and the information sending unit 16 are functional modules implemented when the processor 14 of the information delivery server 1 executes computer programs stored in the memory 13 of the information delivery server 1. Each of these functional modules may be implemented by a dedicated arithmetic circuit provided in the processor 14.

The image processing unit 15 processes the camera images taken in the target area 500. More specifically, based on the camera images taken in the target area 500, the image processing unit 15 generates vehicle related images showing the status of the vehicle 20 moving unmanned in the target area 500.

The information sending unit 16 sends the delivery information, which includes the vehicle related images, to the display terminal visually recognized by the user of the vehicle 20. In this embodiment, since the information delivery server 1 can communicate with a mobile terminal 3 of the user of the vehicle 20 via the wireless base station 30 and the communication network 40 as shown in FIG. 3, the information sending unit 16 sends the delivery information to the mobile terminal 3. The mobile terminal 3 is a terminal such as a smartphone, a tablet terminal, and a watch-type terminal (smart watch).

Sending the delivery information, which includes the vehicle related images showing the status of the vehicle 20 moving unmanned, to the display terminal as mentioned above makes it possible to provide the information on the vehicle 20 to the user of the vehicle 20, thus reducing user anxiety about unattended parking.

In particular, in this embodiment, the information sending unit 16 sends the delivery information to the mobile terminal 3 of the user of the vehicle 20 when the movement of the vehicle 20 is completed. This eliminates the need for the user of the vehicle 20 to have to check the status of the vehicle 20 frequently, improving the convenience of the user.

Figure 6:
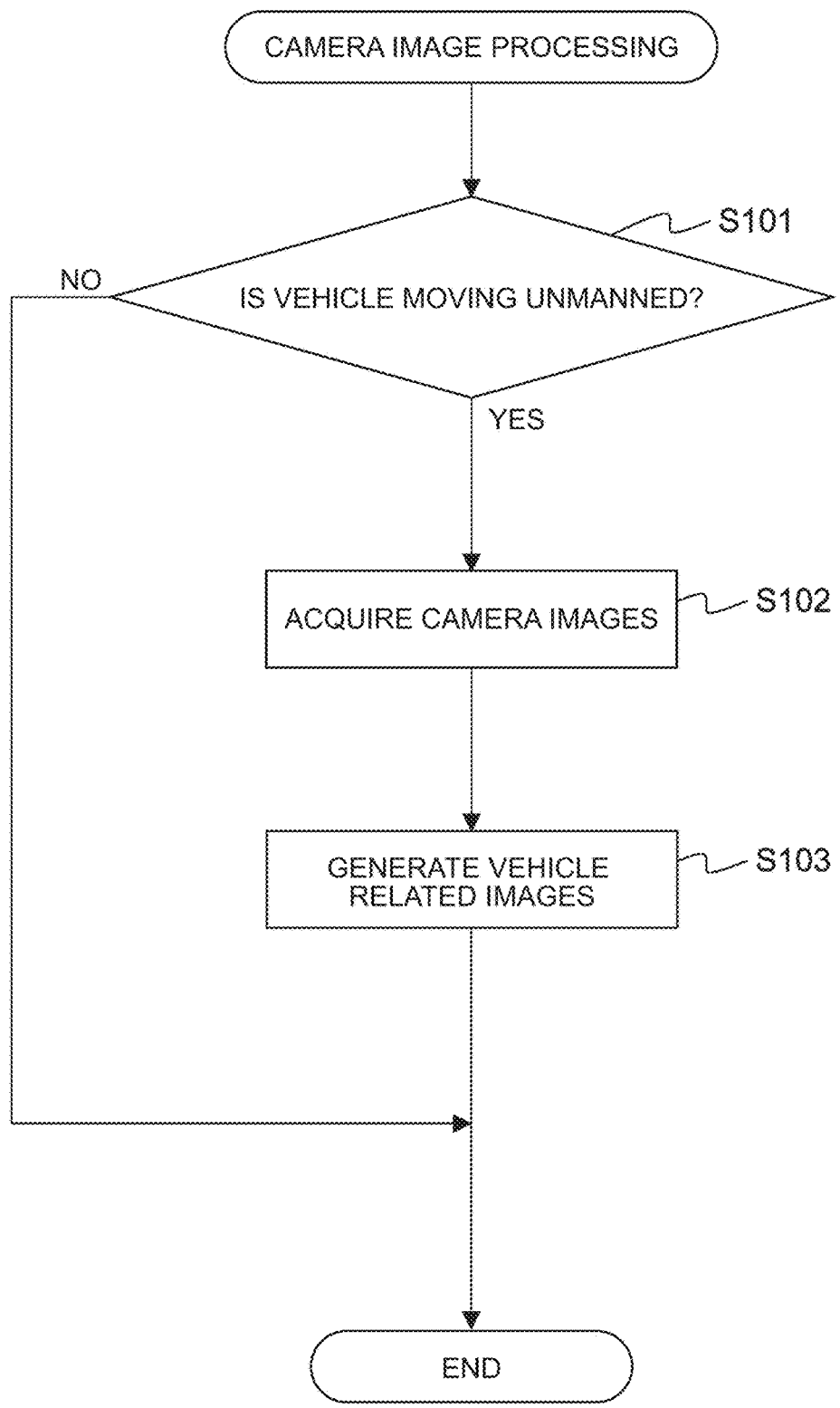
FIG. 6 is a flowchart showing the control routine of camera image processing in the first embodiment.

The control flow when the delivery information is sent to the display terminal will be described in detail below with reference to FIG. 6 and FIG. 7. FIG. 6 is a flowchart showing the control routine of the camera image processing in the first embodiment. This control routine is executed by the processor 14 of the information delivery server 1 according to computer programs stored in the memory 13 of the information delivery server 1.

First, in step S101, the image processing unit 15 determines whether the vehicle 20 is moving unmanned in the target area 500, that is, whether the vehicle 20 is moving for parking in, or exiting from, the target area 500. For example, the image processing unit 15 makes this determination based on the position information on the vehicle 20 sent from the vehicle 20 to the information delivery server 1 (for example, the output of the GNSS receiver provided in the vehicle 20). The image processing unit 15 may make this determination based on the information received from the parking control server 10. When it is determined in step S101 that the vehicle 20 is not moving unmanned, this control routine ends. On the other hand, if it is determined that the vehicle 20 is moving unmanned, the processing of this control routine proceeds to step S102.

In step S102, the image processing unit 15 acquires the camera images taken in the target area 500. For example, the image processing unit 15 acquires the camera images taken by the fixed cameras 540 arranged in the target area 500. In this case, the camera images that include the appearance images of the vehicle 20 directly represent the state of the vehicle 20.

Next, in step S103, the image processing unit 15 generates vehicle related images showing the status of the vehicle 20, which is moving unmanned in the target area 500, based on the camera images. For example, using any one of known detection methods such as background subtraction, inter-frame subtraction, or machine learning, the image processing unit 15 extracts the images of the vehicle 20, which is moving unmanned, from the camera images to generate the vehicle related images. The vehicle related images generated by the image processing unit 15 are stored, together with the identification information on the vehicle 20 (for example, the license plate number), in the storage device 12 or the memory 13 of the information delivery server 1. After step S103, this control routine ends.

In step S102, as the camera images taken in the target area 500, the image processing unit 15 may acquire the camera images taken by the in-vehicle camera 21 provided in the vehicle 20. In this case, the images around the vehicle 20 taken by the in-vehicle camera 21 are directly stored as the vehicle related images in the storage device 12 or the memory 13 of the information delivery server 1.

Figure 7:
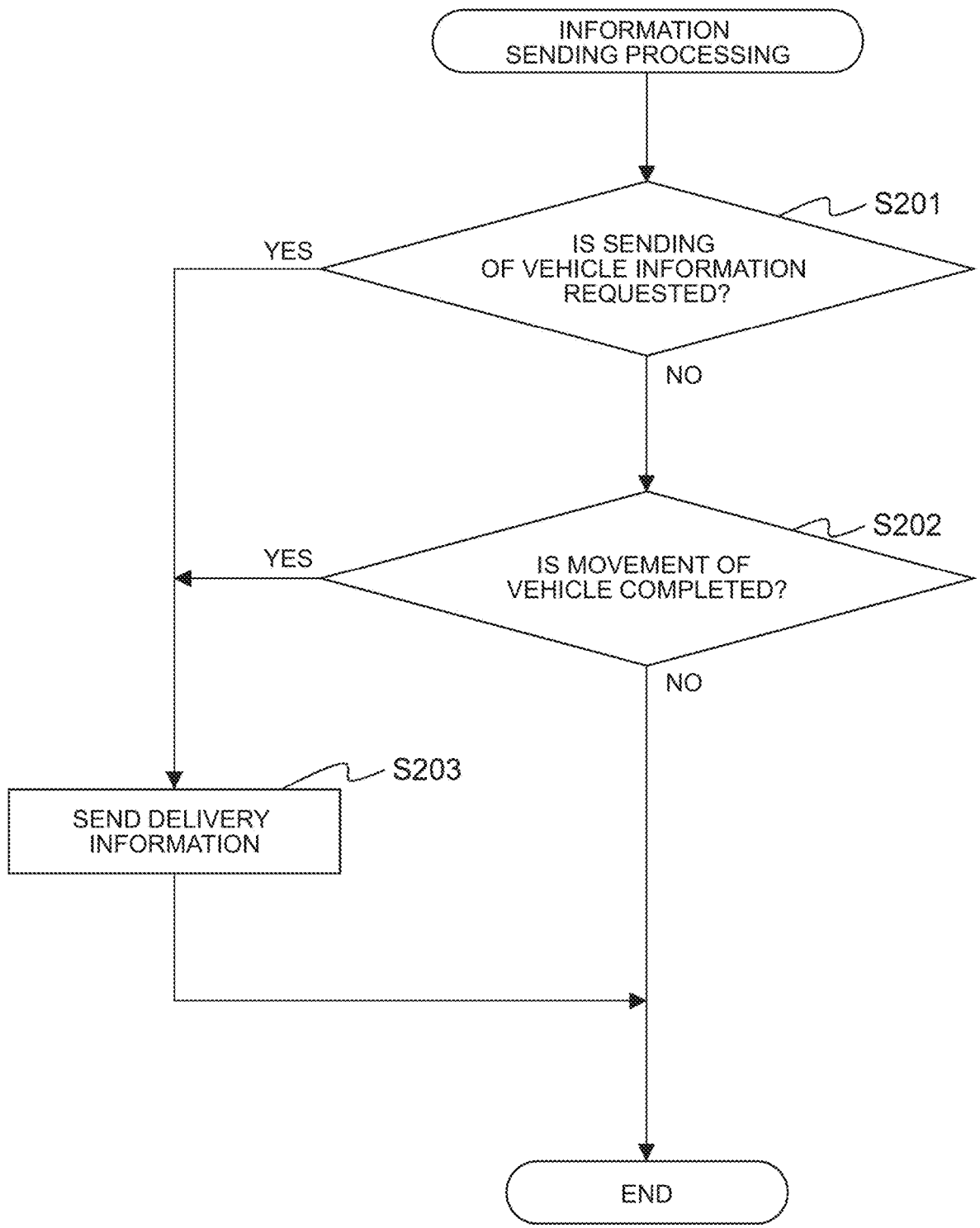
FIG. 7 is a flowchart showing the control routine of information sending processing in the first embodiment.

FIG. 7 is a flowchart showing the control routine of the information sending processing in the first embodiment. This control routine is executed by the processor 14 of the information delivery server 1 according to computer programs stored in the memory 13 of the information delivery server 1.

First, in step S201, the information sending unit 16 determines whether the sending of vehicle information is requested by the user of the vehicle 20. For example, the user of the vehicle 20 who wants to acquire the vehicle information operates the mobile terminal 3 to request the sending of vehicle information. As a result, the information request notification including the identification information on the vehicle 20 (for example, the license plate number), registered in advance by the user of the vehicle 20, is sent from the mobile terminal 3 to the information delivery server 1. Upon receiving this notification, the information sending unit 16 determines that the sending of vehicle information about the vehicle 20 corresponding to the identification information is requested. When it is determined in step S201 that the sending of vehicle information is requested, the processing of this control routine proceeds to step S203.

In step S203, the information sending unit 16 sends the delivery information to the mobile terminal 3 of the user of the vehicle 20. For example, as the delivery information, the information sending unit 16 sends the vehicle related images, which show the current status of the vehicle 20, to the mobile terminal 3. As the delivery information, the information sending unit 16 may send the time-series vehicle-related images (for example, moving images), which show the status of the vehicle 20 from the start of movement of the vehicle 20 to the present, to the mobile terminal 3. After step S203, this control routine ends.

On the other hand, when it is determined in step S201 that the sending of vehicle information is not requested, the processing of this control routine proceeds to step S202. In step S202, the information sending unit 16 determines whether the movement of the vehicle 20 for parking in, or exiting from, the parking lot is completed. The information sending unit 16 makes this determination, for example, based on the position information on the vehicle 20 sent from the vehicle 20 to the information delivery server 1 (such as the output of the GNSS receiver provided in the vehicle 20). Alternatively, the information sending unit 16 may make this determination based on the information received from the parking control server 10 or based on the camera images taken in the target area 500.

When it is determined in step S202 that the movement of the vehicle 20 is not completed, this control routine ends. On the other hand, when it is determined in step S202 that the movement of the vehicle 20 is completed, the processing of this control routine proceeds to step S203.

In step S203, the information sending unit 16 sends the delivery information to the mobile terminal 3 of the user of the vehicle 20 that has completed the movement. The correspondence between the vehicle 20 and the mobile terminal 3, that is, the information indicating the association between the vehicle 20 and the mobile terminal 3, is stored in advance, for example, in the storage device 12 or the memory 13 of the information delivery server 1.

In this case, in step S203, the information sending unit 16 sends, for example, the time-series vehicle related images (such as moving images), which show the status of the vehicle 20 from the start of movement of the vehicle 20 to the completion of movement of the vehicle 20, to the mobile terminal 3 as the delivery information. Note that, when the movement of the vehicle 20 for parking in the parking lot is completed, the information sending unit 16 may send the vehicle related images, which show the status of the vehicle 20 when the vehicle 20 is parked in the parking space 520, to the mobile terminal 3 as the delivery information. Similarly, when the movement of the vehicle 20 for exiting from the parking lot is completed, the information sending unit 16 may send the vehicle related images, which show the status of the vehicle 20 when the vehicle 20 is stopped in the boarding and alighting space 510 or in the boarding space, to the mobile terminal 3 as the delivery information. After step S203, this control routine ends.

When the moving images showing the movement status of the vehicle 20 are sent to the mobile terminal 3 in step S203, the playback speed of the moving images that are sent may be set faster than the actual speed. That is, as the vehicle related images, the information sending unit 16 may send to the mobile terminal 3 the moving images that show the moving status of the vehicle 20 and that have a playback speed faster than the actual speed. In this case, the playback speed of the moving image is set, for example, to 1.2 times to three times faster than the actual speed. This allows the user of the vehicle 20 to quickly check the movement status of the vehicle 20.

Second Embodiment

A vehicle information delivery device according to a second embodiment is basically the same as the vehicle information delivery device according to the first embodiment except for the points described below. Therefore, the second embodiment of the present disclosure will be described below with focus on the parts different from the first embodiment.

Figure 8:
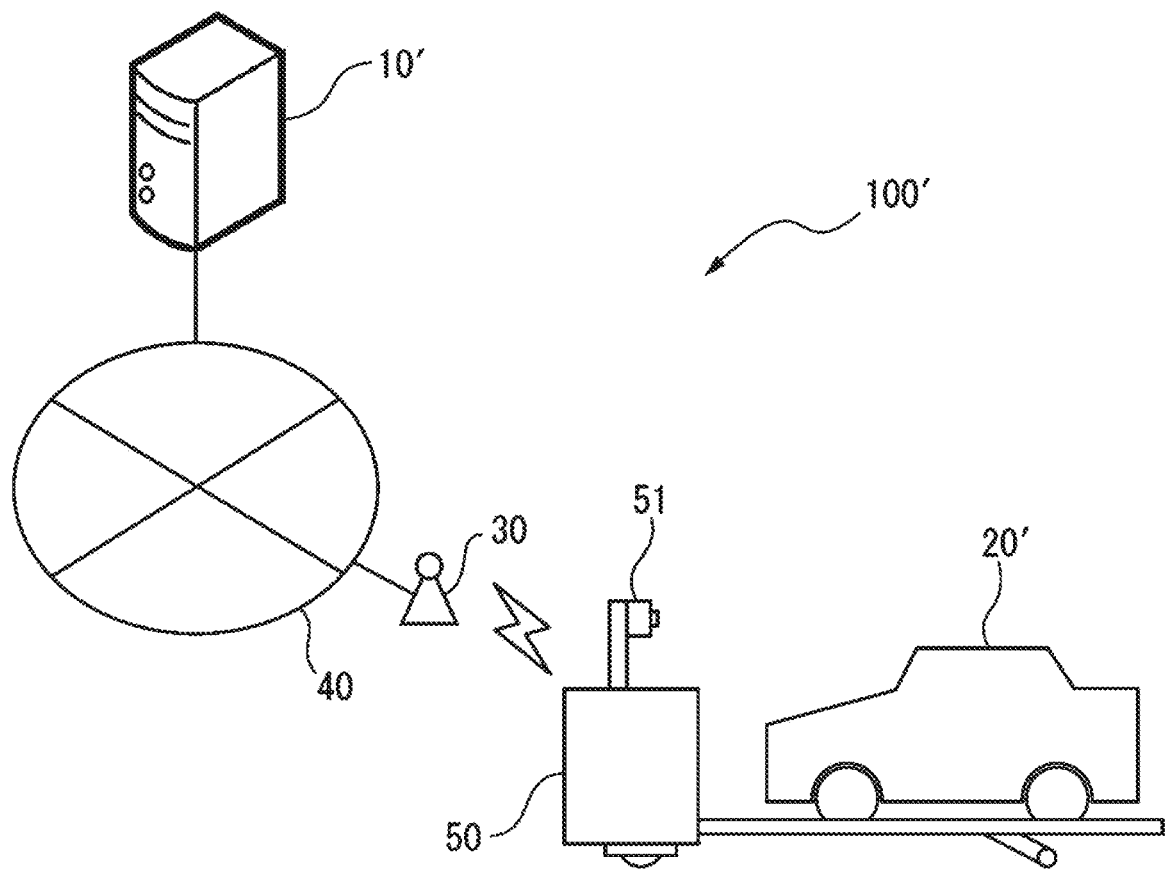
FIG. 8 is a schematic configuration diagram of an automated parking system according to a second embodiment of the present disclosure.

FIG. 8 is a schematic configuration diagram of an automated parking system 100' according to the second embodiment of the present disclosure. As shown in FIG. 8, the automated parking system 100' includes a parking control server 10' and at least one vehicle conveyor 50 to implement unattended parking. The parking control server 10' can communicate with the vehicle conveyor 50 via the wireless base station 30 such as a macro cell or a small cell and a communication network 40 such as the Internet network or a carrier network.

The vehicle conveyor 50, a self-propelled vehicle conveyor, has a known configuration for autonomously conveying a vehicle 20' (see, for example, U.S. Pat. No. 10,590,669, JP 2018-204373 A). For example, from the front or rear of the vehicle 20', the vehicle conveyor 50 inserts the carriage into the space between the bottom of the vehicle 20' and the road surface to lift the four tires of the vehicle 20' for supporting and conveying the vehicle 20'.

The vehicle conveyor 50 has a camera 51. When the vehicle conveyor 50 conveys the vehicle 20', the camera 51 takes the image of the vehicle 20' along with the surroundings of the vehicle 20'. That is, the camera image taken by the camera 51 includes the appearance image of the vehicle 20', with the camera image directly representing the state of the vehicle 20'. The camera 51 is arranged, for example, on the vehicle conveyor 50 so that the entire vehicle 20' is included in the angle of view in the vehicle width direction.

Figure 9:
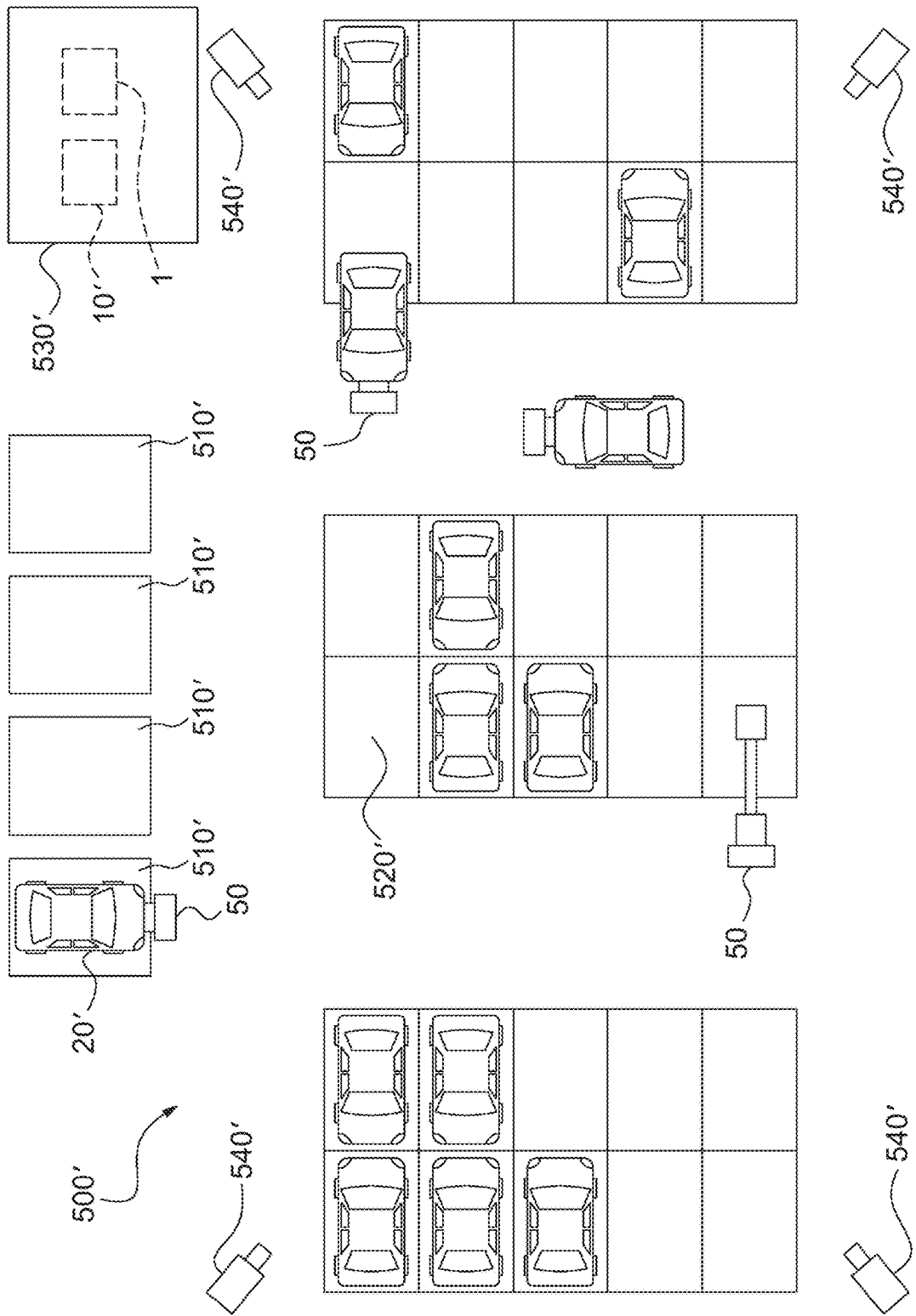
FIG. 9 is a diagram showing an example of a status in which unattended parking is performed in a predetermined target area.

The vehicle conveyor 50 performs unattended parking in a predetermined target area according to an instruction from the parking control server 10'. FIG. 9 is a diagram showing an example of the status of unattended parking in a predetermined target area 500'. The target area 500', which is the same as the target area 500 shown in FIG. 2, includes a plurality of boarding and alighting spaces 510' where the users (occupants) of the vehicles 20' get in and out of vehicles and a plurality of parking spaces 520' where the vehicles 20' are parked.

In the target area 500', the vehicle conveyor 50 conveys the vehicle 20' so that the vehicle 20' can park in, or exit from, the parking lot. More specifically, the vehicle conveyor 50 conveys the vehicle 20' from the boarding and alighting space 510' to the parking space 520' when the vehicle 20' is to park in the parking lot, and from the parking space 520' to the boarding and alighting space 510' when the vehicle 20' is to exit from the parking lot. Therefore, even when the vehicle 20' is a non-autonomous vehicle that does not have the autonomous driving function (that is, a manual driving vehicle), the vehicle 20' can move unmanned to park in, or exit from, the parking lot for implementing unattended parking. Note that, in the target area 500', the alighting space where the user of the vehicle 20' gets out from the vehicle 20' for parking in the parking lot and the boarding space where the user of the vehicle 20' gets in the vehicle 20' for exiting from the parking lot may be provided separately.

The parking control server 10' is arranged, for example, in a parking management center 530' provided near the boarding and alighting space 510'. The parking control server 10', which includes a communication interface, a storage device, a memory, a processor, etc., manages unattended parking in the target area 500'. For example, when the vehicle 20' is to park in, or exit from, the parking lot, the parking control server 10' selects one of the vehicle conveyors 50 that will convey the vehicle 20' and sends a vehicle conveyance instruction to the vehicle conveyor 50. The vehicle conveyance instruction includes, for example, the current position of the vehicle 20' to be conveyed (for example, the identification number of the boarding and alighting space 510' or parking space 520'), the information on the conveyance destination (for example, the identification number of the parking space 520' or the boarding and alighting space 510').

Even when the vehicle 20' is conveyed by the vehicle conveyor 50, the user of the vehicle 20' may feel uneasy about the status of the vehicle 20' in the target area 500' as is the case when the vehicle 20 is autonomously parked. Therefore, in the second embodiment too, the information delivery server 1, which functions as the vehicle information delivery device, delivers the information on the vehicle 20' in the target area 500' to the user of the vehicle 20'.

That is, the image processing unit 15 of the information delivery server 1 generates vehicle related images, which show the status of the vehicle 20' moving unmanned in the target area 500', based on the camera images taken in the target area 500'. After that, the information sending unit 16 of the information delivery server 1 sends the delivery information, which includes the vehicle related images, to the display terminal (e.g., the mobile terminal 3 of the user) visually recognized by the user of the vehicle 20'.

In the second embodiment, too, the control routine of the camera image processing shown in FIG. 6 and the control routine of the information sending processing shown in FIG. 7 are executed as in the first embodiment. At this time, in step S102 in FIG. 6, the images taken by the camera 51 provided on the vehicle conveyor 50 are acquired as the camera images taken in the target area 500. After that, in step S103, these images are stored in the storage device 12 or the memory 13 of the information delivery server 1 as the vehicle related images. In addition, in step S203 in FIG. 7, the images taken by the camera 51 are sent to the mobile terminal 3 of the user of the vehicle 20' as the delivery information. Therefore, the second embodiment can provide the user of vehicle 20' with a realistic image of vehicle 20' taken in the vicinity of vehicle 20' by the camera 51 of the vehicle transport device 50.

Third Embodiment

A vehicle information delivery device according to a third embodiment is basically the same as the vehicle information delivery device according to the second embodiment except for the points described below. Therefore, the third embodiment of the present disclosure will be described below with focus on the parts different from the first embodiment.

Figure 10:
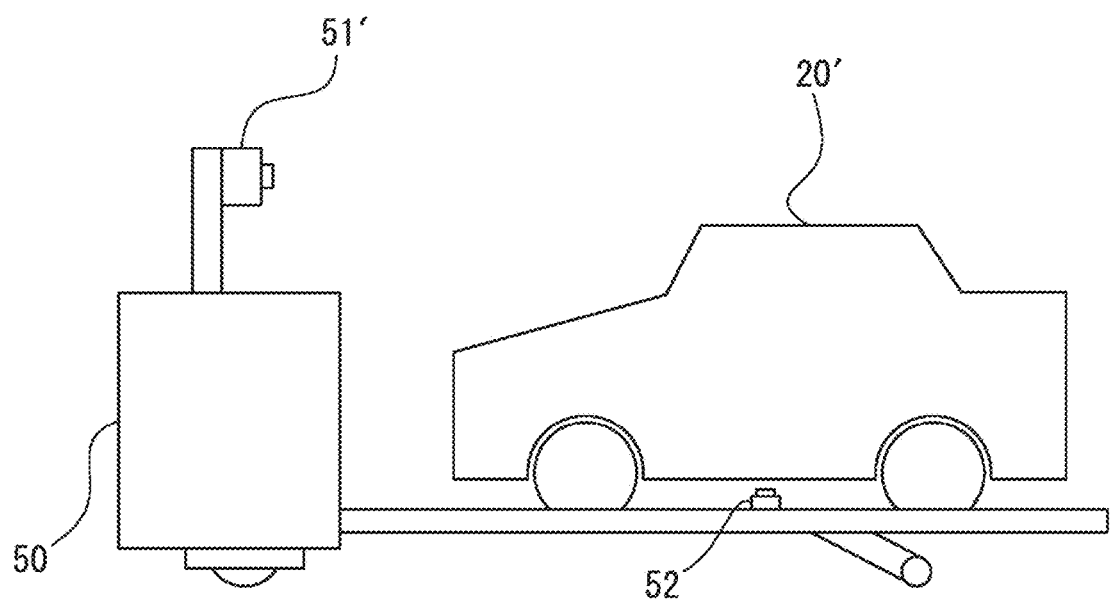
FIG. 10 is a diagram schematically showing a vehicle conveyor used in a third embodiment.

In the third embodiment, the unattended parking of a vehicle is implemented by conveying the vehicle by a vehicle conveyor as in the second embodiment. FIG. 10 is a diagram schematically showing a vehicle conveyor 50' used in the third embodiment.

In the third embodiment, the vehicle conveyor 50' includes two cameras (a first camera 51' and a second camera 52) as shown in FIG. 10. The first camera 51', similar to the camera 51 shown in FIG. 8, takes the picture of the vehicle 20' along with the surroundings of the vehicle 20' when the vehicle conveyor 50' conveys the vehicle 20'. On the other hand, the second camera 52 takes the picture of the bottom of the vehicle 20' when the carriage of the vehicle conveyor 50' is inserted into the space between the bottom of the vehicle 20' and the road surface.

Figure 11:
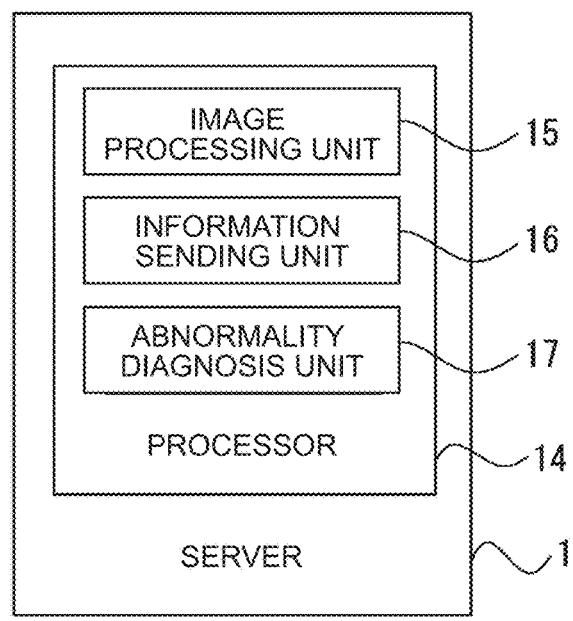
FIG. 11 is a functional block diagram of a processor of an information delivery server in the third embodiment.

FIG. 11 is a functional block diagram of the processor 14 of the information delivery server 1 in the third embodiment. In the third embodiment, the processor 14 includes an abnormality diagnosis unit 17 in addition to the image processing unit 15 and the information sending unit 16. The image processing unit 15, the information sending unit 16, and the abnormality diagnosis unit 17 are functional modules implemented when the processor 14 of the information delivery server 1 executes computer programs stored in the memory 13 of the information delivery server 1. Each of these functional modules may be implemented by a dedicated arithmetic circuit provided in the processor 14.

The abnormality diagnosis unit 17 performs an abnormality diagnosis of the vehicle 20', supported by the vehicle conveyor 50', based on the image the bottom of the vehicle 20' taken by the second camera 52. This makes it possible to easily perform an abnormality diagnosis of the bottom of the vehicle 20', where visual check is difficult, during unattended parking of the vehicle 20', thus providing an additional service to the user of the vehicle 20'.

When an abnormality is detected in the vehicle 20', the abnormality diagnosis unit 17 sends the result of abnormality diagnosis to the mobile terminal 3 of the user of the vehicle 20'. This allows the user of the vehicle 20', when an abnormality is detected in the bottom of the vehicle 20', to recognize the abnormality and to urge the user of the vehicle 20' to inspect the vehicle. Examples of abnormalities in the bottom (on the underside) of the vehicle 20' include rust, corrosion, or damage in parts, and oil leakage.

Figure 12:
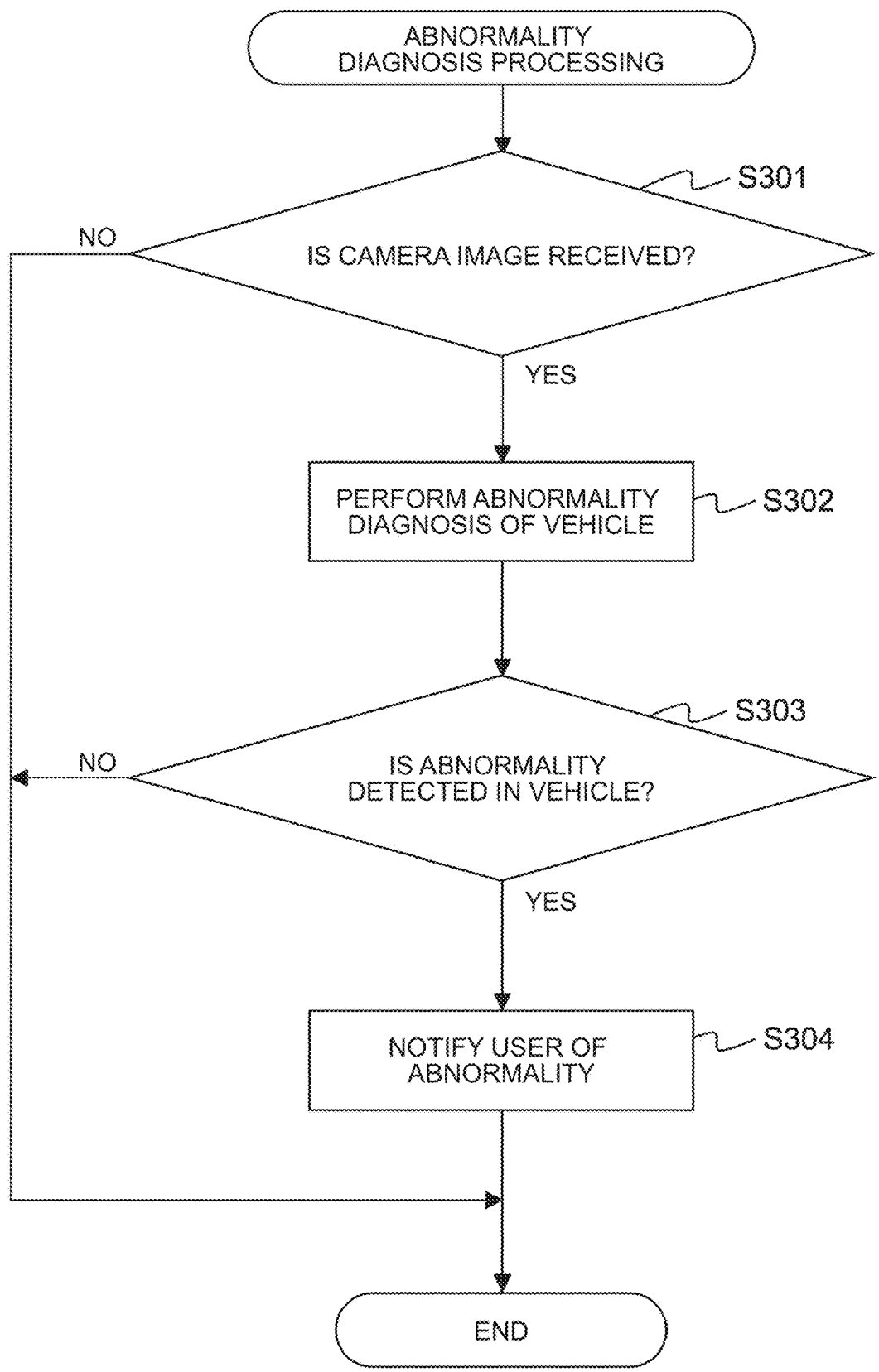
FIG. 12 is a flowchart showing the control routine of abnormality diagnosis processing in the third embodiment.

In the third embodiment, in addition to the control routines of the camera image processing in FIG. 6 and the information sending processing in FIG. 7, the control routine of the abnormality diagnosis processing in FIG. 12 is executed. FIG. 12 is a flowchart showing the control routine of the abnormality diagnosis processing in the third embodiment. This control routine is executed by the processor 14 of the information delivery server 1 according to computer programs stored in the memory 13 of the information delivery server 1.

First, in step S301, the abnormality diagnosis unit 17 determines whether a camera image taken by the second camera 52 is received from the vehicle conveyor 50'. For example, when the conveyance of the vehicle 20' for parking in the parking lot is started in the boarding and alighting space 510', the vehicle conveyor 50' uses the second camera 52 to take the picture of the bottom of the vehicle 20' and sends the camera image, taken by second camera 52, to the information delivery server 1. Alternatively, when the conveyance of the vehicle 20' for exiting from the parking lot is started in the parking space 520', the vehicle conveyor 50' may use the second camera 52 to take the picture of the bottom of the vehicle 20' and sends the camera image, taken by the second camera 52, to the information delivery server 1.

When it is determined in step S301 that a camera image is not received, this control routine ends. On the other hand, when it is determined in step S301 that a camera image is received, the processing of this control routine proceeds to step S302.

In step S302, the abnormality diagnosis unit 17 performs an abnormality diagnosis of the vehicle 20' based on the camera image taken by the second camera 52. For example, the abnormality diagnosis unit 17 performs an abnormality diagnosis of the vehicle 20' using a discriminator that is pre-trained in advance so as to output an abnormality in the vehicle 20' from the camera image if any. Examples of such discriminators include machine learning models such as neural networks, support vector machines, and random forests.

Next, in step S303, the abnormality diagnosis unit 17 determines whether an abnormality is detected in the vehicle 20'. When it is determined that no abnormality is detected in the vehicle 20', this control routine ends. On the other hand, when it is determined that an abnormality is detected in the vehicle 20', the processing of this control routine proceeds to step S304.

In step S304, the abnormality diagnosis unit 17 sends the result of abnormality diagnosis to the mobile terminal 3 of the user of the vehicle 20' to notify the user of the abnormality in the vehicle 20' via the mobile terminal 3. After step S304, this control routine ends.

Fourth Embodiment

A vehicle information delivery device according to a fourth embodiment is basically the same as the vehicle information delivery device according to the first embodiment except for the points described below. Therefore, the fourth embodiment of the present disclosure will be described below with focus on the parts different from the first embodiment.

Figure 13:
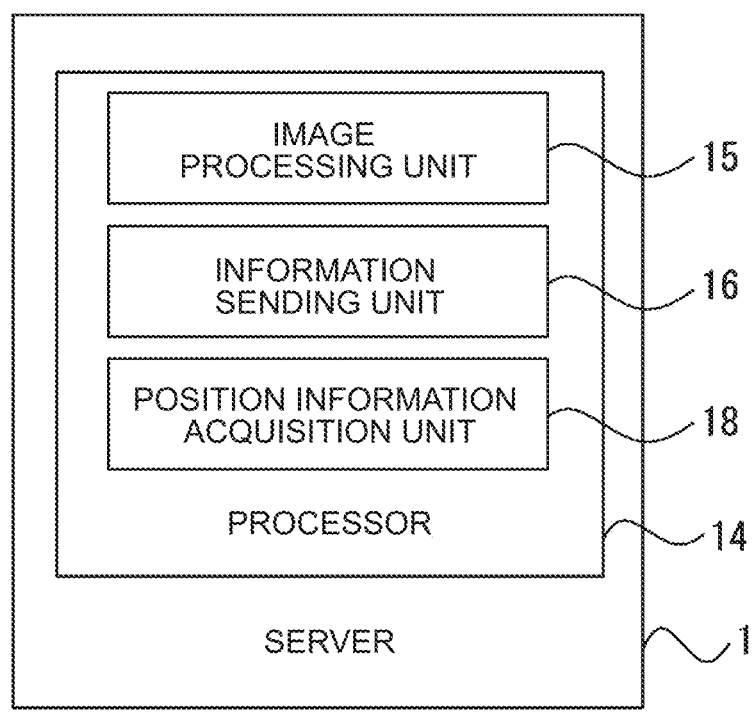
FIG. 13 is a functional block diagram of a processor of an information delivery server in a fourth embodiment.

FIG. 13 is a functional block diagram of the processor 14 of the information delivery server 1 in the fourth embodiment. In the fourth embodiment, the processor 14 includes a position information acquisition unit 18 in addition to the image processing unit 15 and the information sending unit 16. The image processing unit 15, the information sending unit 16, and the position information acquisition unit 18 are functional modules implemented when the processor 14 of the information delivery server 1 executes computer programs stored in the memory 13 of the information delivery server 1. Each of these functional modules may be implemented by a dedicated arithmetic circuit provided in the processor 14.

The position information acquisition unit 18 acquires the position information on the vehicle 20 moving unmanned in the target area 500, and the information sending unit 16 sends the delivery information that includes the position information on the vehicle 20 in addition to the vehicle related images to the mobile terminal 3 of the user of the vehicle 20. This allows the user to know the position of the vehicle 20 in the target area 500, further enhancing a user's sense of security.

In addition, the position information acquisition unit 18 calculates the estimated required time to complete the movement of the vehicle 20 based on the position information on the vehicle 20, and the information sending unit 16 sends the delivery information that includes the estimated required time in addition to the vehicle related images to the mobile terminal 3 of the user of the vehicle 20. This allows the user of the vehicle 20 to more accurately understand the movement status of the vehicle 20, further improving the convenience of the user.

In addition, the position information acquisition unit 18 determines whether the movement of the vehicle 20 for exiting from the parking lot will be completed by the scheduled time, based on the estimated required time, and the information sending unit 16 sends the delivery information that includes the estimated required time in addition to the vehicle related images to the mobile terminal 3 of the user of the vehicle 20 when it is determined that the movement of the vehicle 20 for exiting from the parking lot will not be completed by the scheduled time. This allows the user of the vehicle 20 to be notified in advance that the movement of the vehicle 20 for exiting from the parking lot will not be completed by the scheduled time, thus reducing user's anxiety due to the non-arrival of the vehicle 20.

Figure 14:
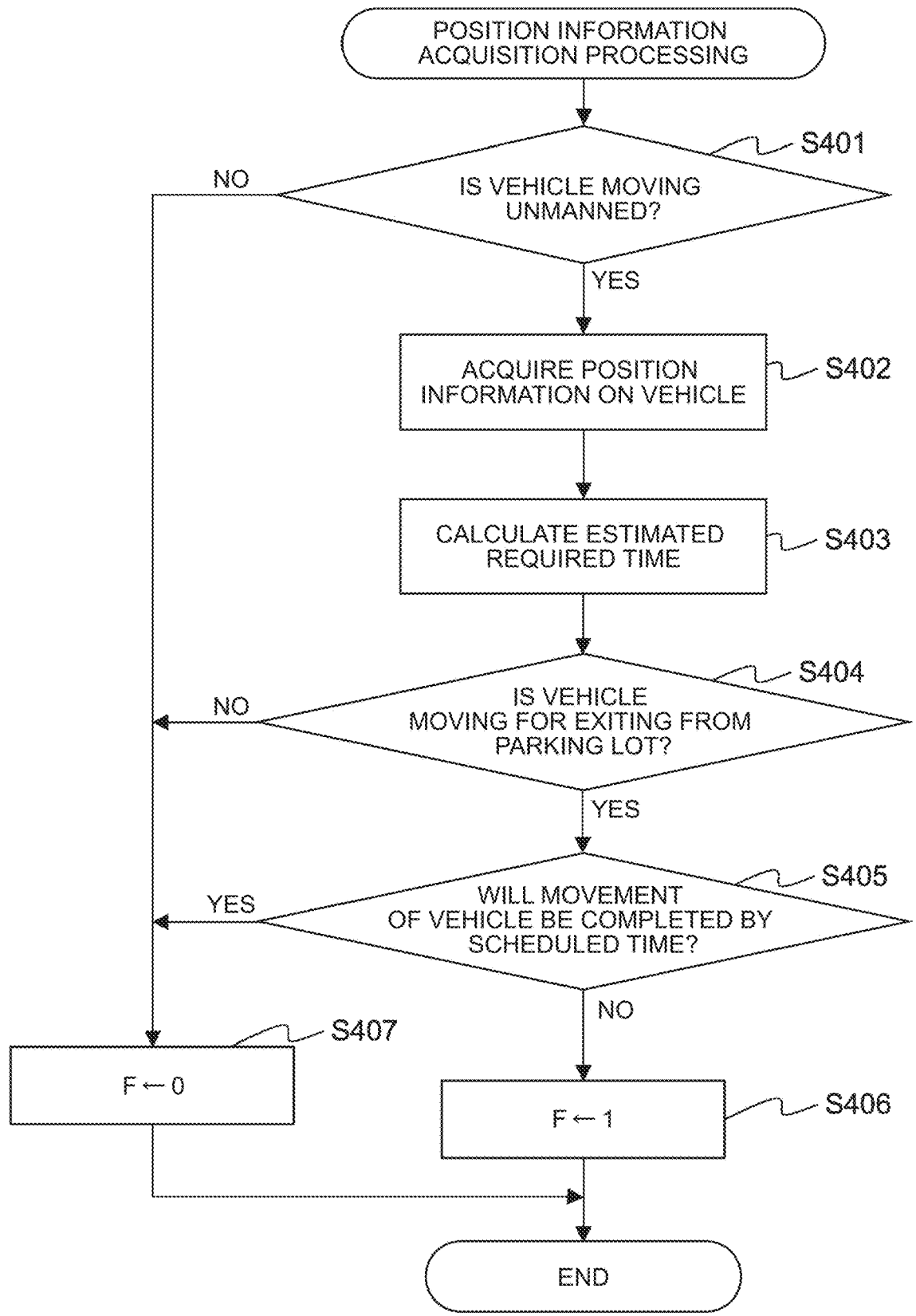
FIG. 14 is a flowchart showing the control routine of position information acquisition processing in the fourth embodiment.

In the fourth embodiment, the control routine of the position information acquisition processing shown in FIG. 14 is executed in addition to the control routine of the camera image processing shown in FIG. 6 and the control routine of the information sending processing shown in FIG. 15 that will be described later. FIG. 14 is a flowchart showing the control routine of the position information acquisition processing in the fourth embodiment. This control routine is executed by the processor 14 of the information delivery server 1 according to computer programs stored in the memory 13 of the information delivery server 1.

First, in step S401, the position information acquisition unit 18 determines whether the vehicle 20 is moving unmanned in the target area 500, that is, whether the vehicle 20 is parking in, or existing from, the target area 500. This determination is executed in the same manner as in step S101 in FIG. 6. When it is determined that the vehicle 20 is moving unmanned, the processing of this control routine proceeds to step S402.

In step S402, the position information acquisition unit 18 acquires the position information on the vehicle 20 (for example, the output of the GNSS receiver provided in the vehicle 20).

Next, in step S403, the position information acquisition unit 18 calculates the estimated required time to complete the movement of the vehicle 20 based on the position information on the vehicle 20. For example, the position information acquisition unit 18 calculates the estimated required time by dividing the movement distance, from the current position of the vehicle 20 to the movement completion point of the vehicle 20 (parking space 520 or the boarding and alighting space 510), by the predetermined movement speed.

Next, in step S404, the position information acquisition unit 18 determines whether the vehicle 20 is moving for exiting from the parking lot. When it is determined that the vehicle 20 is moving for exiting from the parking lot, the processing of this control routine proceeds to step S405.

In step S405, based on the estimated required time to complete the movement of the vehicle 20, the position information acquisition unit 18 determines whether the movement of the vehicle 20 for exiting from the parking lot will be completed by the scheduled time. The scheduled time is set by the user of the vehicle 20 or by the parking control server 10, for example, when the vehicle 20 is parked in the parking lot. When it is determined that the movement of the vehicle 20 will not be completed by the scheduled time, the processing of this control routine proceeds to step S406.

In step S406, the position information acquisition unit 18 sets the flag F to 1. After step S406, this control routine ends.

On the other hand, when the determination in step S401 or S404 is negative or the determination in S405 is affirmative, the processing of the control routine proceeds to step S407. In step S407, the position information acquisition unit 18 resets the flag F to 0. After step S407, this control routine ends.

Figure 15:
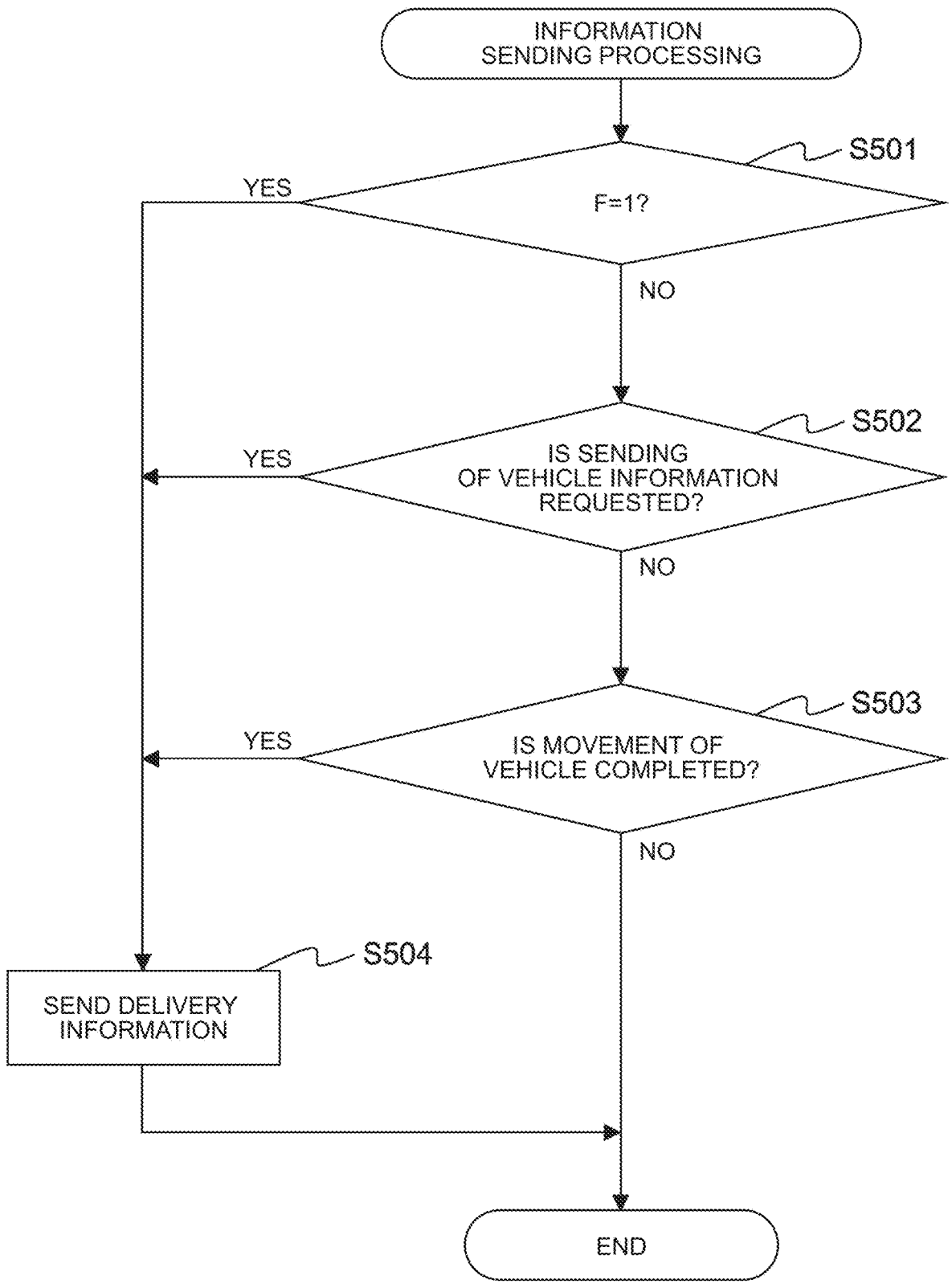
FIG. 15 is a flowchart showing the control routine of information sending processing in the fourth embodiment.

FIG. 15 is a flowchart showing the control routine of the information sending processing in the fourth embodiment. This control routine is executed by the processor 14 of the information delivery server 1 according to computer program stored in the memory 13 of the information delivery server 1.

First, in step S501, the information sending unit 16 determines whether the flag F is set to 1. When it is determined that the flag F is set to 1, the processing of this control routine proceeds to step S504.

In step S504, the information sending unit 16 sends the delivery information to the mobile terminal 3 of the user of the vehicle 20. For example, the information sending unit 16 sends the following three types of information to the mobile terminal 3 of the user of the vehicle 20 as the delivery information: the vehicle related images showing the current status of the vehicle 20, the position information on the vehicle 20, and the estimated required time to complete the movement of the vehicle 20. When the position information on the vehicle 20 is sent, the map of the target area 500, together with the current position of the vehicle 20 on the map, is shown. The position information on the vehicle 20 may be omitted from the delivery information. After step S504, this control routine ends.

On the other hand, when it is determined in step S501 that the flag F is set to 0, the processing of this control routine proceeds to step S502. In this case, steps S502 to S504 are executed in the same manner as steps S201 to S203 in FIG. 7. When the determination in step S502 is affirmative, at least one of the position information on the vehicle 20 and the estimated required time to complete the movement of the vehicle 20 in addition to the vehicle related images may be sent as the delivery information. When the determination in step S503 is affirmative, the position information on the vehicle 20 in addition to the vehicle related images may be sent as the delivery information.

Fifth Embodiment

A vehicle information delivery device according to a fifth embodiment is basically the same as the vehicle information delivery device according to the first embodiment except for the points described below. Therefore, the fifth embodiment of the present disclosure will be described below with focus on the parts different from the first embodiment.

Figure 16:
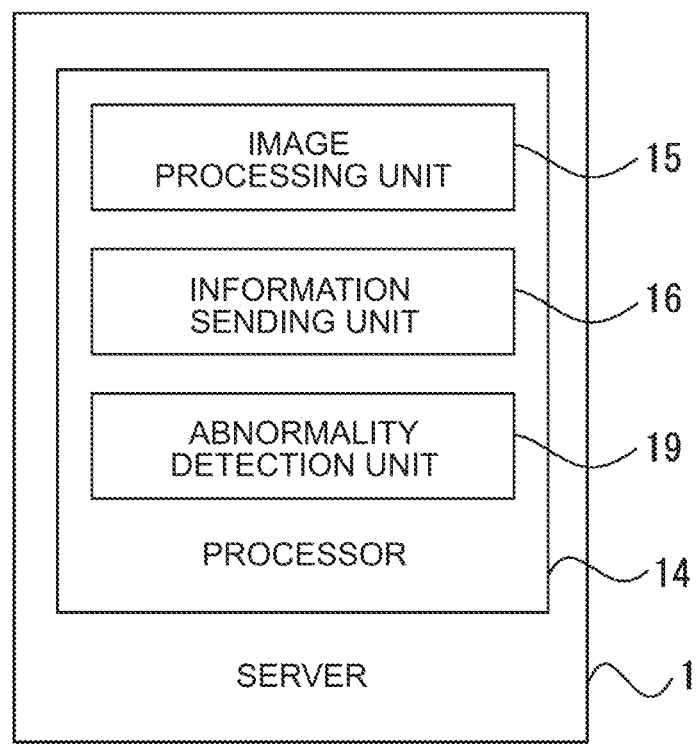
FIG. 16 is a functional block diagram of a processor of an information delivery server in a fifth embodiment.

FIG. 16 is a functional block diagram of the processor 14 of the information delivery server 1 in the fifth embodiment. In the fifth embodiment, the processor 14 includes an abnormality detection unit 19 in addition to the image processing unit 15 and the information sending unit 16. The image processing unit 15, the information sending unit 16, and the abnormality detection unit 19 are functional modules implemented when the processor 14 of the information delivery server 1 executes computer programs stored in the memory 13 of the information delivery server 1. Each of these functional modules may be implemented by a dedicated arithmetic circuit provided in the processor 14.

The abnormality detection unit 19 detects an abnormality related to the movement of the vehicle 20 and, when an abnormality related to the movement of the vehicle 20 is detected, the information sending unit 16 sends the delivery information to the mobile terminal 3 of the user of the vehicle 20. This makes it possible to quickly notify the user of the vehicle 20 that an abnormality has occurred in the movement of the vehicle 20.

For example, the abnormality detection unit 19 detects an abnormality related to the movement of the vehicle 20 based on the camera images taken in the target area 500. As a specific example, when it is detected, based on the camera images, that the vehicle 20 has not moved for a predetermined time or longer in a place other than the boarding and lighting space 510 and the parking space 520, the abnormality detection unit 19 determines that an abnormality has occurred in the movement of vehicle 20. In addition, when it is detected, based on the camera images, that the vehicle 20 comes into contact with an obstacle (for example, another vehicle, a falling object), the abnormality detection unit 19 determines that an abnormality has occurred in the movement of the vehicle 20. The abnormality detection unit 19 may detect an abnormality related to movement of the vehicle 20 based on information sent from the vehicle 20 to the information delivery server 1 (for example, position information on the vehicle 20).

Figure 17:
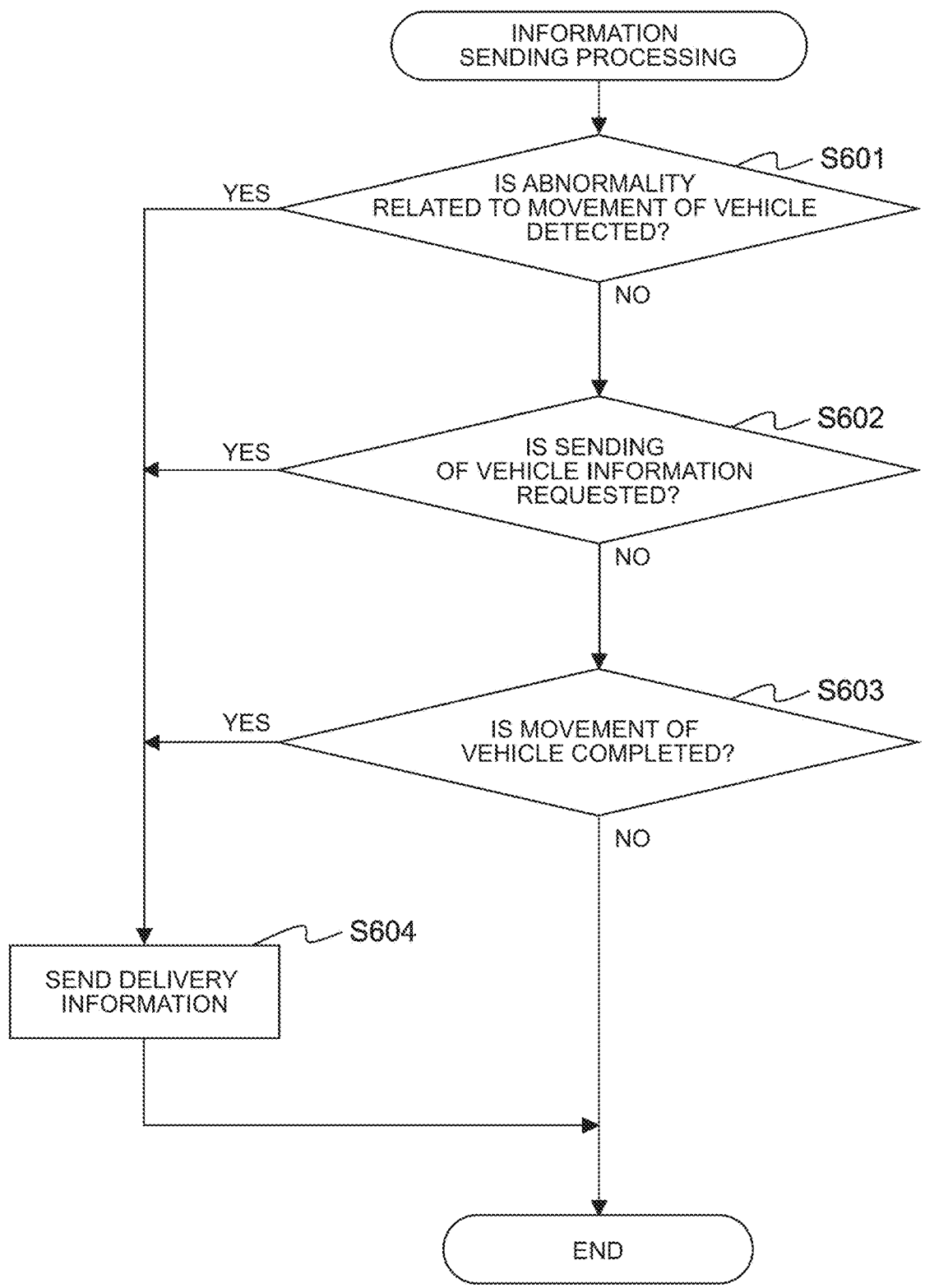
FIG. 17 is a flowchart showing the control routine of information sending processing in the fifth embodiment.

FIG. 17 is a flowchart showing the control routine of the information sending processing in the fifth embodiment. This control routine is executed by the processor 14 of the information delivery server 1 according to computer programs stored in the memory 13 of the information delivery server 1.

First, in step S601, the information sending unit 16 determines whether the abnormality detection unit 19 detects an abnormality related to the movement of the vehicle 20. When it is determined that an abnormality related to movement of the vehicle 20 is detected, the processing of this control routine proceeds to step S604. In step S604, the information sending unit 16 sends the delivery information to the mobile terminal 3 of the user of the vehicle 20. For example, the information sending unit 16 sends the vehicle related images indicating the current status of the vehicle 20 to the mobile terminal 3 of the user of the vehicle 20 as the delivery information. In addition to the vehicle related images, the information sending unit 16 may send the details of the abnormality in the vehicle 20 (stopped due to defects, fender bender, etc.) as the delivery information. After step S604, this control routine ends.

On the other hand, when it is determined in step S601 that no abnormality related to the movement of the vehicle 20 is detected, the processing of this control routine proceeds to step S602. In this case, steps S602-S604 are executed in the same manner as steps S201-S203 in FIG. 7.

Other Embodiments

Although preferred embodiments of the present disclosure have been described above, the present disclosure is not limited to these embodiments and various modifications and changes may be made within the scope of claims.

For example, instead of sending the delivery information to the mobile terminal 3 of the user of the vehicle 20 or the vehicle 20', the information sending unit 16 may send the delivery information to an output device (display, digital signage, etc.) installed in a predetermined location (such as a predetermined facility near the boarding and alighting space 510 or boarding and alighting space 510' or adjacent to the target area 500'). In addition, in the target area 500 or target area 500', unattended parking may be performed for both autonomous vehicles and non-autonomous vehicles.

In the second embodiment, the camera images taken by the fixed cameras 540' (see FIG. 9), arranged in the target area 500', may be acquired as the camera images taken in the target area 500'. Also, in the second embodiment, the camera 51 may be provided on the vehicle conveyor 50 to take only the surroundings of the vehicle 20'.

A computer program that causes a computer to implement the functions of the units of the processor 14 of the information delivery server 1 may be provided in a form stored in a computer-readable recording medium (storage medium). A computer-readable recording medium (storage medium) is, for example, a magnetic recording medium, an optical recording medium, or a semiconductor memory.

The embodiments described above may be performed in any combinations. For example, when the second embodiment is combined with the fourth embodiment, the vehicle 20' is conveyed by the vehicle conveyor 50 in the fourth embodiment. In this case, in step S402 in FIG. 14, the position information acquisition unit 18 acquires, for example, the output of the GNSS receiver, which is provided on the vehicle conveyor 50, from the vehicle conveyor 50 as the position information on the vehicle 20.

When the second embodiment is combined with the fifth embodiment, the abnormality detection unit 19 detects an abnormality in the vehicle conveyor 50 as an abnormality related to the movement of the vehicle 20' in the fifth embodiment. For example, the abnormality detection unit 19 determines that an abnormality has occurred in the movement of the vehicle 20' when it is detected that the vehicle conveyor 50 comes into contact with an obstacle (for example, another vehicle conveyor, a falling object) based on the camera images taken in the target area 500 or based on the information sent from the vehicle conveyor 50 to the information delivery server 1.

When the third embodiment is combined with the fourth or fifth embodiment, the vehicle 20' is conveyed by the vehicle conveyor 50' and the control routine of the abnormality diagnosis processing shown in FIG. 12 is executed in the fourth or fifth embodiment.

What is claimed is:

1. A vehicle information delivery device, comprising:
   an image processing unit configured to generate vehicle related images based on camera images taken in a predetermined target area where unattended parking is performed, the vehicle related images indicating a status of a vehicle moving unmanned in the target area;
   an information sending unit configured to send delivery information including the vehicle related images to a display terminal visually recognized by a user of the vehicle; and
   an abnormality diagnosis unit configured to perform an abnormality diagnosis of the vehicle, wherein
   the vehicle is conveyed in the target area by a vehicle conveyor; and
   the abnormality diagnosis unit is configured to perform the abnormality diagnosis of the vehicle based on an image of a bottom of the vehicle taken by a camera provided on the vehicle conveyor and located to face toward the bottom of the vehicle.

2. The vehicle information delivery device according to claim 1, wherein the display terminal is a mobile terminal of the user.

3. The vehicle information delivery device according to claim 1, wherein the vehicle related images are moving images indicating a movement status of the vehicle and having a playback speed faster than an actual speed.

4. The vehicle information delivery device according to claim 1, wherein the information sending unit is configured to send the delivery information to the display terminal in response to movement of the vehicle being completed.

5. The vehicle information delivery device according to claim 1, wherein the camera images include appearance images of the vehicle.

6. The vehicle information delivery device according to claim 2, wherein the abnormality diagnosis unit is configured to send a result of the abnormality diagnosis to the mobile terminal of the user of the vehicle in response to an abnormality being detected in the vehicle.

7. The vehicle information delivery device according to claim 1, the vehicle information delivery device further comprising a position information acquisition unit configured to acquire position information on the vehicle, wherein the delivery information includes the position information on the vehicle.

8. The vehicle information delivery device according to claim 1, further comprising a position information acquisition unit configured to acquire position information on the vehicle, wherein:
the position information acquisition unit is configured to calculate an estimated required time to complete movement of the vehicle based on the position information; and
the delivery information includes the estimated required time.

9. The vehicle information delivery device according to claim 8, wherein:
the position information acquisition unit is configured to determine, based on the estimated required time, whether the movement of the vehicle for exiting from a parking lot will be completed by a scheduled time; and
the information sending unit is configured to send the delivery information to the display terminal in response to determining that the movement of the vehicle for exiting from the parking lot will not be completed by the scheduled time.

10. The vehicle information delivery device according to claim 1, further comprising an abnormality detection unit configured to detect an abnormality related to movement of the vehicle, wherein the information sending unit is configured to send the delivery information to the display terminal in response to an abnormality related to the movement of the vehicle being detected.

11. The vehicle information delivery device according to claim 10, wherein
the abnormality detection unit is configured to detect an abnormality in the vehicle conveyor as the abnormality related to the movement of the vehicle.

12. A vehicle information delivery method performed by a computer, the vehicle information delivery method comprising:
generating vehicle related images based on camera images taken in a predetermined target area where unattended parking is performed, the vehicle related images indicating a status of a vehicle moving unmanned in the target area;
sending delivery information including the vehicle related images to a display terminal visually recognized by a user of the vehicle; and
performing an abnormality diagnosis of the vehicle, wherein
the vehicle is conveyed in the target area by a vehicle conveyor, and
the abnormality diagnosis of the vehicle is performed based on an image of a bottom of the vehicle taken by a camera provided on the vehicle conveyor and located to face toward the bottom of the vehicle.

13. A non-transitory storage medium storing a computer program for delivering vehicle information, the computer program causing, when executed by a computer, the computer to:
generate vehicle related images based on camera images taken in a predetermined target area where unattended parking is performed, the vehicle related images indicating a status of a vehicle moving unmanned in the target area;
send delivery information including the vehicle related images to a display terminal visually recognized by a user of the vehicle; and
perform an abnormality diagnosis of the vehicle, wherein
the vehicle is conveyed in the target area by a vehicle conveyor, and
the computer program, when executed by the device, causes the computer to perform the abnormality diagnosis of the vehicle based on an image of a bottom of the vehicle taken by a camera provided on the vehicle conveyor and located to face toward the bottom of the vehicle.

14. The vehicle information delivery device according to claim 1, wherein
the target area includes a boarding and alighting space where the vehicle is stopped, and
the vehicle information delivery device is configured to receive the image of the bottom of the vehicle taken by the camera provided on the vehicle conveyor in response to conveyance of the vehicle for parking in the parking lot being started in the boarding and alighting space.

15. The vehicle information delivery device according to claim 1, wherein
the target area includes a parking space for the vehicle to be parked, and
the vehicle information delivery device is configured to receive the image of the bottom of the vehicle taken by the camera in response to conveyance of the vehicle for exiting from the parking lot being started in the parking space.

16. The vehicle information delivery device according to claim 14, wherein
the abnormality diagnosis unit is configured to
perform the abnormality diagnosis of the vehicle in response to receiving the image of the bottom of the vehicle taken by the camera, and
not perform the abnormality diagnosis of the vehicle in response to no image of the bottom of the vehicle taken by the camera being received.

17. The vehicle information delivery device according to claim 15, wherein
the abnormality diagnosis unit is configured to
perform the abnormality diagnosis of the vehicle in response to receiving the image of the bottom of the vehicle taken by the camera, and not perform the abnormality diagnosis of the vehicle in response to no image of the bottom of the vehicle taken by the camera being received.

\* \* \* \* \*